(12) United States Patent
Suh et al.

(10) Patent No.: US 6,701,205 B2
(45) Date of Patent: Mar. 2, 2004

(54) SYSTEM INTEGRATION BASED ON TIME-DEPENDENT PERIODIC COMPLEXITY

(75) Inventors: Nam P. Suh, Sudbury, MA (US); Taesik Lee, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/134,707

(22) Filed: Apr. 29, 2002

(65) Prior Publication Data

US 2003/0171835 A1 Sep. 11, 2003

Related U.S. Application Data

(60) Provisional application No. 60/362,252, filed on Mar. 6, 2002.

(51) Int. Cl.[7] .............................. G06F 19/00; G06F 9/04
(52) U.S. Cl. ......................... 700/121; 700/96; 709/102; 709/103
(58) Field of Search ................................. 700/121, 106, 700/107, 96, 100, 99, 102, 103

(56) References Cited

U.S. PATENT DOCUMENTS

| | | | | |
|---|---|---|---|---|
| 4,827,423 A | * | 5/1989 | Beasley et al. | 700/96 |
| 5,291,397 A | * | 3/1994 | Powell | 700/100 |
| 5,826,238 A | * | 10/1998 | Chen et al. | 700/103 |
| 5,928,389 A | | 7/1999 | Jevtic | 29/25.01 |
| 6,201,999 B1 | | 3/2001 | Jevtic | 700/100 |
| 6,336,204 B1 | | 1/2002 | Jevtic | 716/1 |
| 6,351,686 B1 | * | 2/2002 | Iwasaki et al. | 700/121 |
| 6,473,664 B1 | * | 10/2002 | Lee et al. | 700/110 |

OTHER PUBLICATIONS

Perkinson et al., "Single–Wafer Cluster Tool Performance: An Analysis of the Effects of Redundant Chambers and Revisitation Sequences on Throughput," *IEEE Transactions on Semiconductor Manufacturing*, vol. 9, No. 3, Aug. 1996.
Rostami et al., "An Optimal Scheduling Technique for Dual–arm Robots in Cluster Tools with Residency Constraints," *Proceedings of the 39th IEEE Conference on Decision and Control*, Syndney, Australia, Dec. 2000.
Oh et al., "Reducing Complexity of Wafer Flow to Improve Quality and Throughput in a Single–Wafer Cluster Tool," *IEEE/CPMT International Electronics Manufacturing Technology Symposium*, 1999.
Chen et al., "Cyclic Scheduling of a Hoist with Time Window Constraints," *IEEE Transactions on Robotics and Automation*, vol. 14, No. 1, Feb. 1998.

* cited by examiner

*Primary Examiner*—Albert W. Paladini
(74) *Attorney, Agent, or Firm*—Testa, Hurwitz & Thibeault, LLP

(57) ABSTRACT

A processing system having time-dependent combinatorial complexity is converted into a system having time-dependent periodic complexity. Consequently, system reliability is increased and system design is generally simplified.

11 Claims, 23 Drawing Sheets

| t¹ = INITIALIZED t | 0 5 10 15 20 25 30 35 40 45 50 55 60 65 70 75 |
|---|---|
| CT_Y | 0 5 10 15 20 25 30 35 40 45 50 55 60 65 |

| | STATE | |
|---|---|---|
| MACHINE a | 15 | a |
| MACHINE b | 15 | b |
| MACHINE c | 15 | c |
| MACHINE d1 | OCP | |
| MACHINE d2 | 15 | d2 |

FIG. 7

| | t' = INITIALIZED t<br>CT$_Y$ | 0 5 10 15 20 25 30 35 40 45 50 55 60 65 70 75 80 85 90 95 100<br>0 5 10 15 20 25 30 35 40 45 50 55 60 65 70 75 80 |
|---|---|---|
| | STATE | |
| MACHINE a | 15 | a　　　OCCUPIED　　　7 8 9 10 │ MACHINE a │ |
| MACHINE b | 15 | b　　　OCCUPIED　　5 6　　│ MACHINE b │ |
| MACHINE c | 15 | c │ 3 4 │ IDLE　　│ MACHINE c │ 3 4 │ |
| MACHINE d1 | 15 | │ 1 2 │　　　│ MACHINE d1 │ |
| MACHINE d2 | OCP | │ d2 │　　OCCUPIED |
| ROBOT | | │ 1 2 │ 3 4 │　　5 6 7 8 9 10　│X X X X│ |

FIG. 8

| t' = INITIALIZED t | | 0 5 10 15 20 25 30 35 40 45 50 55 60 65 70 75 80 85 90 95 100 |
|---|---|---|
| | CT$_Y$ | 0 5 10 15 20 25 30 35 40 45 50 55 60 65 70 75 80 85 |
| | STATE | |
| MACHINE a | OCP | OCCUPIED |
| MACHINE b | EMP | IDLE |
| MACHINE c | 60 | c |
| MACHINE d1 | 70 | d1 |
| MACHINE d2 | OCP | |

FIG. 11

| | t' = INITIALIZED t | 0 5 10 15 20 25 30 35 40 45 50 55 60 65 70 75 | 80 85 90 95 100 |
|---|---|---|---|
| | CT_Y | 0 5 10 15 20 25 30 35 40 45 50 55 60 65 | 70 75 80 85 |
| | STATE | | |
| MACHINE a | OCP | OCCUPIED 9 10   MACHINE a | |
| MACHINE b | EMP | IDLE 7 8   MACHINE b | |
| MACHINE c | 60 | MACHINE c   3 4   5 6 | |
| MACHINE d1 | 70 | MACHINE d1 | 1 |
| MACHINE d2 | OCP | 1 2   IDLE   3 4 | MACHINE d2 |
| ROBOT | | 1 2   7 8 9 10   3 4   5 6 | |

BEGINNING OF NEW PERIOD

FIG. 12

| | $t^1$ = INITIALIZED t | 0 5 10 15 20 25 30 35 40 45 50 55 60 65 |
|---|---|---|
| | $CT_Y$ | 0 5 10 15 20 25 30 35 40 45 50 55 |
| | STATE | |
| MACHINE a | 25 | a |
| MACHINE b | 25 | b |
| MACHINE c | 25 | c |
| MACHINE d1 | OCP | |
| MACHINE d2 | 45 | d2 |

FIG. 16

| t' = INITIALIZED t | 0 5 10 15 20 25 30 35 40 45 50 55 60 65 70 75 80 |
| CT$_Y$ | 0 5 10 15 20 25 30 35 40 45 50 55 60 65 70 |

| | STATE | |
|---|---|---|
| MACHINE a | 25 | a           OCC.  7 8 9 10    a |
| MACHINE b | 25 | b    OCC.  5 6            b |
| MACHINE c | 25 | c    3 4            c |
| MACHINE d1 | OCP | 1 2  IDLE           d1 |
| MACHINE d2 | 45 | d2           OCCUPIED |
| ROBOT | | 1 2    3 4  5 6 7 8 9 10  X X X |

FIG. 17

SYSTEM INTEGRATION BASED ON TIME-DEPENDENT PERIODIC COMPLEXITY

RELATED APPLICATION

The present application claims the benefits of U.S. Provisional Application Ser. No. 60/362,252, entitled "System Integration Through the Creation of Time-Dependent Periodic Complexity from Time-Dependent Combinatorial Complexity" and filed on Mar. 6, 2002, the entire disclosure of which is hereby incorporated by reference.

FIELD OF THE INVENTION

The invention relates to system integration, and more specifically to scheduling subsystems having independent processing machines.

BACKGROUND OF THE INVENTION

A "system" for purposes hereof is an integrated entity that includes two or more subsystems. Examples of systems include parts-manufacturing systems, semiconductor-fabrication facilities, and retailer supply-chain systems. Subsystems can be, for example, machines, robots, transport systems, people and software modules. System integration includes the process of coupling subsystems so that the resulting system achieves a set of functional requirements.

System integration can be a difficult task if the subsystems are obtained from different sources or vendors, or are otherwise not fully compatible. Additional integration challenges arise if the processing machines or processing stations of the subsystems have random process time variations. In particular, if two or more subsystems perform processes with different fluctuating cycle times, the scheduling of items through the system becomes more difficult with increasing time. The increase in the number of possible processing scenarios due to this time-dependent combinatorial complexity results in increasing uncertainty in time. Ad hoc approaches based on prior experience are typically used to deal with systems having time-dependent combinatorial complexity. Even in such systems, however, combinatorial expansion can eventually lead to operation in a chaotic state or even total system failure.

SUMMARY OF THE INVENTION

The present invention relates to system integration for systems having independent subsystems. The subsystems can include processing stations or machines that can have varying processing times. The invention increases system reliability by converting systems having time-dependent combinatorial complexity into systems having time-dependent periodic complexity.

One aspect of the invention relates to a method of managing a processing system having a plurality of functional requirements. The method includes the steps of determining a time to completion for each of a plurality of processes in a current period, determining a wait (or buffer) time for each process in the current period, determining a system period in response to the times to completion and the wait times, and initializing the functional requirements based on the system period. In one embodiment the step of initializing the functional requirements is performed at the expiration of the system period. In another embodiment the step of initializing the functional requirements is performed at the occurrence of a key functional requirement.

Another aspect of the invention relates to a system for processing items according to a plurality of processing tasks. Each of the processing tasks is performed at a processing station, or machine. The system includes a monitor module in communication with the processing station to determine a completion time for each processing task in a current processing period. The system also includes a processor that communicates with the monitor module. The processor determines wait times for each processing task in response to the completion times. The processor determines a system period in response to the wait times and the completion times. The wait times govern the movement of items among the processing tasks.

BRIEF DESCRIPTION OF THE DRAWINGS

The invention is pointed out with particularity in the appended claims. The advantages of the invention may be better understood by referring to the following description taken in conjunction with the accompanying drawing in which:

FIGS. 7, 16 and 17 graphically depicts information upon which a transport schedule may be constructed; and FIGS. 8, 11 and 12 depict representative transport schedules.

DETAILED DESCRIPTION OF THE INVENTION

Figure 1:
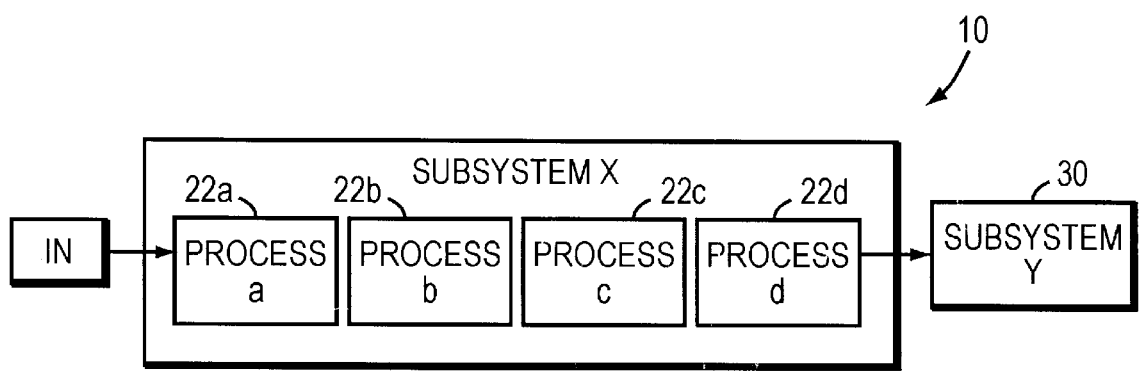
FIG. 1 schematically illustrates a representative system to which the present invention may be applied.

FIG. 1 depicts an integrated system 10 for producing a product and includes a subsystem X 20 and a subsystem Y 30. Each subsystem 20, 30 includes physical modules (such as machines 22a, 22b, 22c, 22d shown for subsystem X) to process a part sequentially according to a process recipe. The process times for the physical modules are generally different. The throughput rates of the subsystems 20, 30 vary from nominal values due to various stochastic factors. After completion of the last operation in subsystem X, a part is taken by a robot or other transport module (not shown) to subsystem Y with minimal delay in order to maintain a high system throughput rate.

The theoretical maximum throughput rate of the total system 10 is approximately equal to the throughput rate of the slower subsystem 20, 30. The maximum throughput rate can be substantially less than the theoretical maximum throughput rate, however, due to factors such as the random variation in the process times, conflicts in scheduling pick-up times by the transportation modules, and constraints imposed on the system operations. The subsystem modules 22 generally complete their associated processes at different times because parts arrive at each module 22 at different times, the nominal process times are generally different, and one or more of the processes can experience variations in completion times. Moreover, processes can sometimes be completed at the same time and compete for transport module availability. The subsequent part flow and schedule of the transport module differ according to which part is picked up first by the transport module. Each decision point is a bifurcation in a scheduling method, and therefore, the number of possible combinations for the part flow and transport module paths increases with the number of decisions that are made. This type of system is defined as a time-dependent combinatorial complexity system in which subsequent decisions are affected by previous decisions, so the number of possible combinations increases in time.

An integrated system with a time-dependent combinatorial complexity cannot sustain the maximum theoretical throughput rate. Such a system, however, can be converted into a system having time-dependent periodic complexity. The reduction of the system complexity through such a transformation increases the productivity of the system. Conversion to a system having time-dependent periodic complexity can be achieved through a "re-initialization" of the system, i.e., establishment of new initial conditions as the beginning of a new period. Re-initialization is possible if there exists a period in which all processes are repeated, and the establishment of new initial conditions for each process is possible at the beginning of each period. Preferably, re-initialization is based on the shortest cycle time during which all processes are completed after establishment of the new initial conditions. The period begins when a key function, triggered internally or externally, causes the system to be re-initialized. The following description is a general formulation of a system scheduling problem and the application of functional periodicity to improve the system productivity.

Generalized System Scheduling Problem

The total time required to process a part, W, in subsystem X given by $$W = \sum_{i=1}^{N} (P_i + q_i) + (N+1) \cdot t_p \quad (1)$$

where N is the number of processes with process times $P_i$, $t_p$ is the time required to transport the part from module to module and $q_i$ is the wait time (i.e., buffer time) inserted to prevent concurrent demand for the transport module. Under steady state operation, the total number of parts that can be processed in a unit time, n, is given by $$n = 1/t_s \quad (2)$$

where $t_s$ is the sending period, i.e., the time between the feeding of the parts into the first module 22a. Equation (2) represents the case for which there is no delay in removing a finished part from the first module 22a. The actual sending period $t_s^a$ is given by $$t_s^a = t_s + q_0 \quad (3)$$

where $q_0$ is the wait time for the first module 22a.

The minimum sending time $(t_s)_{min}$ is equal to the sum of the process time of the slowest process (i.e., bottleneck process) $P_b$ and its associated transport time. The sending period can be made equal to $(t_s)_{min}$ with nonzero values for at least some of the wait times $q_i$. If all the processes must be tightly controlled so that all the wait times $(q_1, \ldots, q_N)$, except $q_0$ are equal to zero, then a determination of the actual sending period that yields the highest throughput rate is made. In this case, the sending period $t_s$ may be longer than $(t_s)_{min}$. The maximum throughput rate can be obtained by determining a set of the sending times $t_s^a$, corresponding to a set of values of $q_0$, that permits processing the parts without creating scheduling conflicts. The wait time $q_0$ for the first module 22a can have multiple values. If the wait time $q_0$ has two values, one cycle (or a period) consists of two parts undergoing an identical set of processes, i.e., a two-part cycle. Similarly, if the wait time $q_0$ has three values, the period of the system corresponds to a three-part cycle.

If the process times P vary randomly, the processing time W for a part is given by $$W = \sum_{i=1}^{N} (P_i + q_i + \delta P_i) + (N+1) \cdot t_p \quad (4)$$

where $\delta P_i$ is the random variation of process time $P_i$. In the presence of random variations in process times P, the beginning of each new period coincides with the recurrence of a key function in functional space rather than a key event in temporal space. The maximum throughput rate when such variations are present can be achieved by means of a re-initialization when a key reference function is repeated. The goal is to establish the best sending times $t_s$ by finding an appropriate set of wait times q for each of the processes P.

Application of Functional Periodicity to a System Scheduling Problem

To improve the productivity of a processing system, the sending period of the system is decreased. In most practical systems, the cycle time is not constant, instead fluctuating about a mean cycle time due to variations in process time and transport times. Referring again to FIG. 1 for an exemplary application of functional periodicity to system scheduling, processes a through d are performed in subsystem X by machines $M_a$ through $M_d$, respectively. Each machine M processes only one part at a time. Each part is transported by a robot located in subsystem X. In this illustrative example, process c is time critical such that a part in machine $M_c$ must be removed as soon as process c is completed. Considerations of economic efficiency render highly desirable the maximum utilization rate of subsystem Y.

The process time $PT_a$, $PT_b$, $PT_c$, $PT_d$ for each process a, b, c, d is the time between receipt of a part and completion of all processing at the respective machine $M_a$, $M_b$, $M_c$, $M_d$. The cycle time $CT_Y$ of subsystem Y is defined as the time between receipt of a part at subsystem Y and removal of the part from subsystem Y. $CT_Y$ represents the time when subsystem Y is ready to receive its next part after receipt of its last part. It should be noted, however, that machine $M_a$ is generally still occupied at a time $PT_a$ after receipt of a part, and machine $M_a$ is not ready to take its next part until its current part is removed by the robot.

Figure 2:
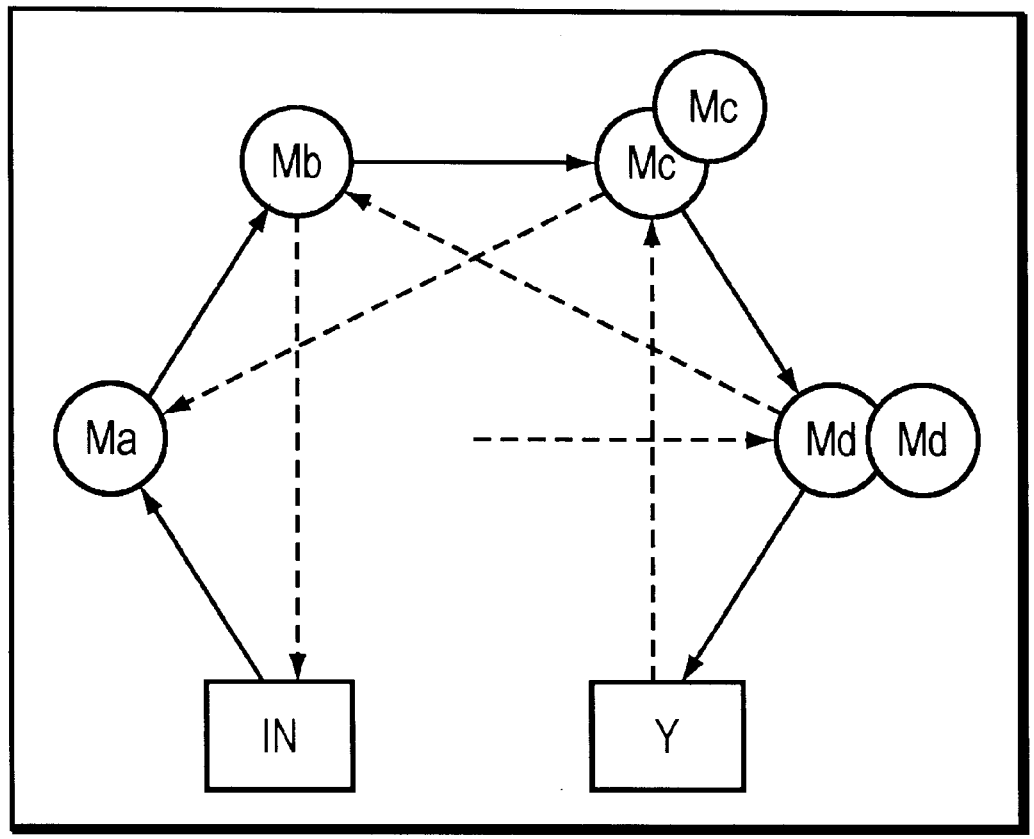
FIG. 2 schematically illustrates a physical configuration for the system shown in FIG. 1.

FIG. 2 depicts a physical configuration of the exemplary system 10 with one of the possible robot travel paths in subsystem X. The configuration is characterized by a transporter surrounded by multiple process machines $M_a$, $M_b$, $M_c$, $M_d$. Such a system is generally referred to as a cluster tool. The number of commonly labeled circles indicates the number of machines for the respective process, and is determined based on the process time and required throughput rate.

The maximum steady state throughput rate is the reciprocal of the nominal fundamental period FP which is given by $$FP = \text{Max}\left[\frac{PT_i + MvPk_i + MvPl_{i+1} + MvPk_{i-1} + MvPl_i}{n_i}\right] \quad (5)$$

$$i = a, b, c, d$$

where $MvPk_i$ is the time for a robot to move to machine $M_i$ and pick up a part, $MvPl_j$ is the time for a robot to move to machine $M_j$ and place a part, and $n_i$ is the number of machines for process i. (+1) and (−1) in the subscripts indicate the next and previous machines M, respectively. For example, when i=a, (i−1) is IN and (i+1) is b. Equation (5) assumes a simple scheduling scenario, i.e., the robot waits at its current position, and only begins moving toward a destination machine M after the process performed by machine M is completed.

If the throughput of subsystem X is less than the throughput rate of subsystem Y and, therefore, determines the pace of the integrated system 10, the fundamental period FP is given by $$FP = FP_X = \text{Max}\left[\frac{PT_i + MvPk_i + MvPl_{i+1} + MvPk_{i-1} + MvPl_i}{n_i}\right] \quad (6)$$

$$i = a, b, c, d$$

If subsystem Y is slower than subsystem X, the fundamental period FP of the total system 10 is given by $$FP = FP_Y = CT_Y + MvPk_{Y-1} + MvPl_Y \quad (7)$$

where $MvPk_{Y-1}$ is the time for a robot to move to one of the last process machines $M_d$ in subsystem X and pick up a part and $MvPl_Y$ is the time for a robot to move to with the part to subsystem Y. The fundamental period FP of the overall system 10 is given by the larger of the fundamental period $FP_X$ for subsystem X and the fundamental period $FP_Y$ for subsystem Y.

Based on the process times and transport times, the number of machines M for each process is selected to achieve the required system throughput rate. For example, if the fundamental period $FP_X$ of subsystem X is larger than the fundamental period $FP_Y$ of subsystem Y, and $FP_X$ is determined by process Pi, adding more machines Mi to perform process Pi generally reduces the fundamental period $FP_X$. The new fundamental period FP is then generally determined by another process in subsystem X. This design progression is repeated until the desired fundamental period FP and throughput rate of the system 10 are achieved.

The following three cases illustrate the re-initialization of systems to achieve time-dependent periodic complexity for different subsystem throughput relationships. In each case, the maximum productivity (i.e., throughput rate) is attained when the operations of the subsystems are subject to a repeated re-initialization implemented after the completion of a subsystem cycle. Re-initialization introduces "periodicity" and thus changes the scheduling problem from that of a time-dependent combinatorial complexity to a time-dependent periodic complexity problem.

Case 1: The Throughput Rate of Subsystem X is Greater Than That of Subsystem Y: $FP_X < FP_Y$ Table 1 shows the process times for processes a, b, c, d, the cycle times for subsystem Y, the number of machines for each process, and the associated transport times. According to equations (2) and (3), the fundamental period $FP_X$ for subsystem X is 70 seconds and the functional period $FP_Y$ for subsystem Y is 90 seconds. Therefore, the fundamental period FP of the system 10 is 90 seconds.

As subsystem X is faster than subsystem Y, the goal of increasing system productivity is achieved through modification of subsystem Y.

TABLE 1

| Station | $PT_i$ or $CT_Y$ (sec) | Number of machines | $MvPk_i$ (sec) | $MvPl_i$ (sec) |
|---------|-----|---|---|---|
| IN | — | 1 | 5 | — |
| X |   |   |   |   |
| a | 30 | 1 | 5 | 5 |
| b | 40 | 1 | 5 | 5 |
| c | 50 | 1 | 5 | 5 |
| d | 80 | 2 | 5 | 5 |
| Y | 80 | 1 | — | 5 |

(a) Constant Cycle Times for Subsystem X and Subsystem Y

Figure 3:
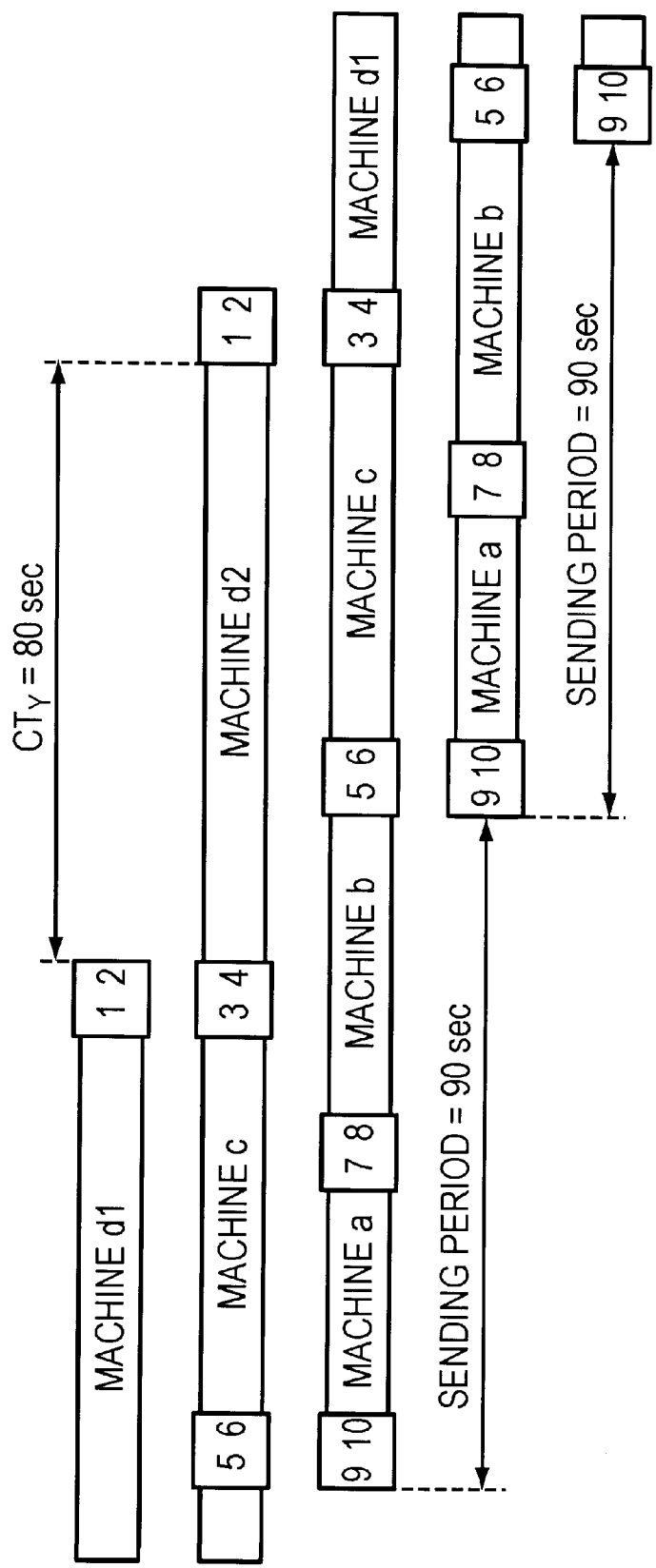
FIGS. 3–6, 9, 10, and 13–15 are part-flow timing diagrams illustrating operation of the invention in connection with the system shown in FIGS. 1 and 2.

Referring to the part-flow timing diagram of FIG. 3, process times $PT_a$, $PT_b$, $PT_c$, $PT_d$ for subsystem X are constant and the cycle time $CT_Y$ for subsystem Y is also constant. Thus, there are no variations in the fundamental period of the system. The horizontal axis represents time and the vertical axis (row) represents different parts processed by subsystem X. In particular, the first row represents the flow of a first part processed by subsystem X, the second row represents the flow of the second part processed by subsystem X, etc. An incoming part is received by subsystem X every 90 seconds, i.e., at the fundamental period $FP_Y$.

Figure 4:
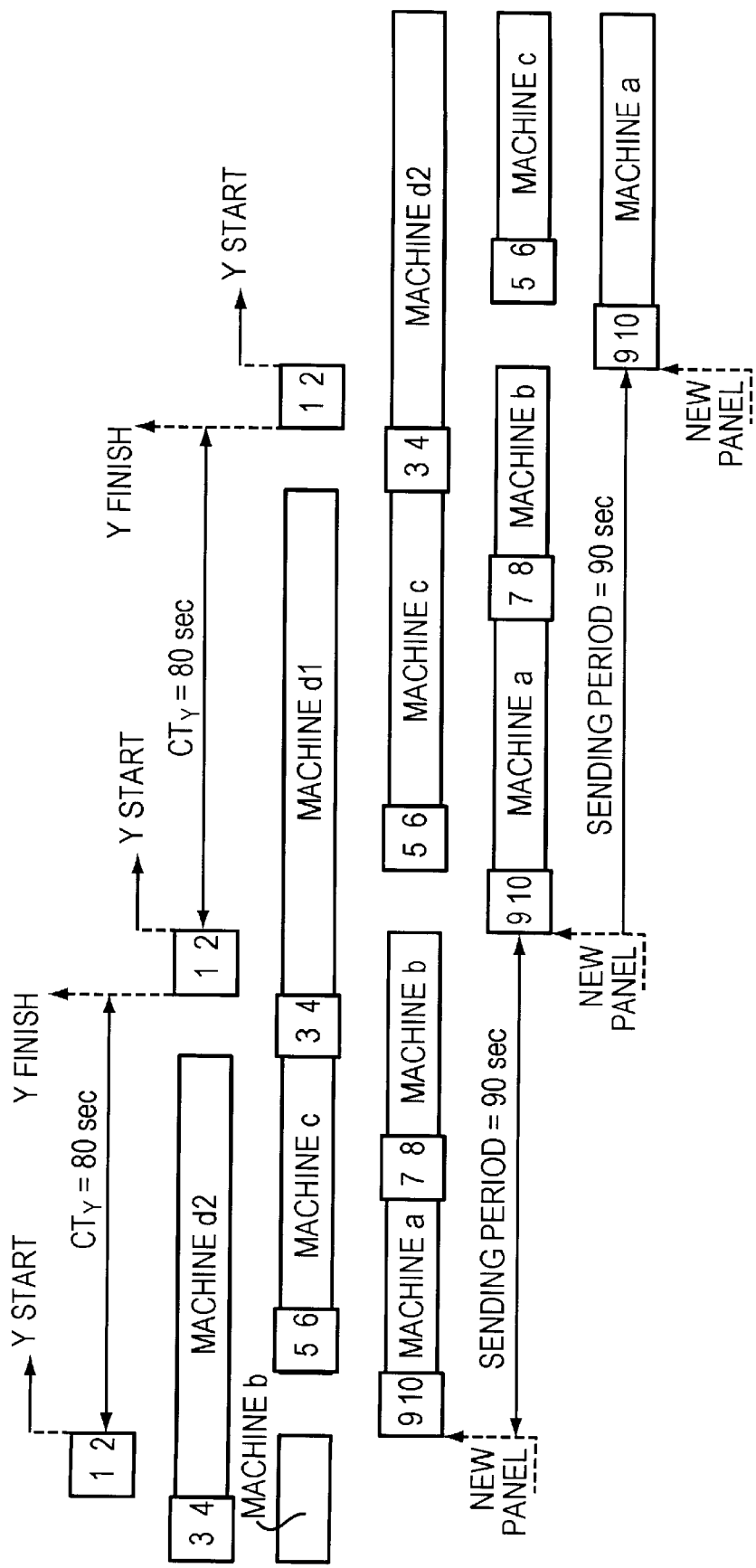

Two transport conflicts repeatedly occur in subsystem X, one between transports (1,2) and (3,4) and a second between transports (5,6) and (9,10). The pick-up schedule for subsystem X is determined according to which part is picked up first by the robot at the moment of the transport conflict. Thus, the number of possible routes for the robot increases as additional decisions are made at the time of the conflicts. The system 10 is therefore subject time-dependent combinatorial complexity. However, if waiting times are appropriately selected, the complexity of the subsystem X can be converted into a time-dependent periodic complexity. FIG. 4 shows that an additional 10 seconds of post-process waiting time in machine $M_b$ and another 10 seconds post-process waiting time in machine $M_d$ resolves the transport conflicts without the need for real-time decision-making and maintains a 90 second sending period for the system 10.

Figure 5:
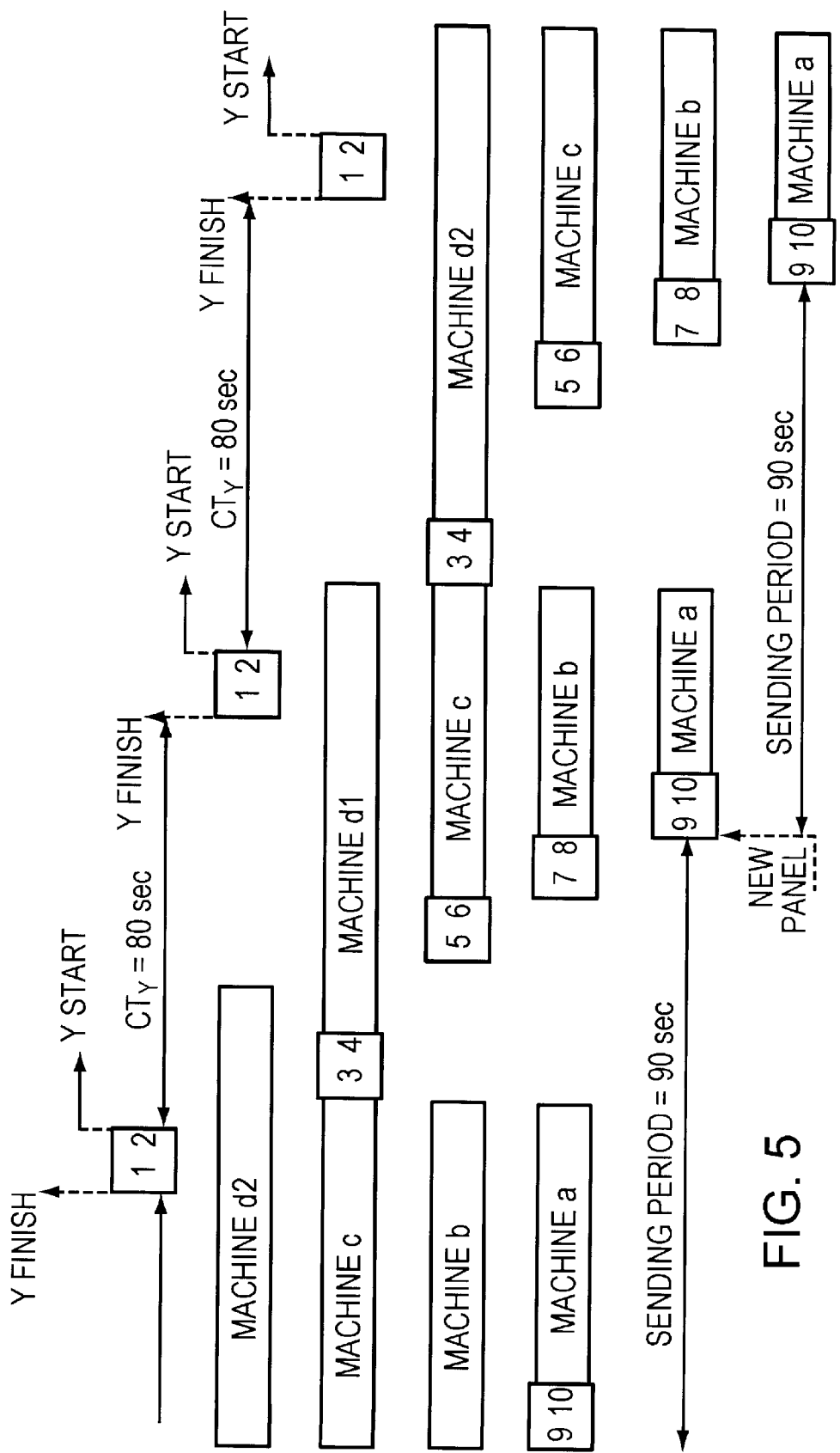

FIG. 5 illustrates another steady state solution for operation of subsystem X for the same example. The part-flow timing diagram illustrates the evolution of the subsystem X from an empty state without enforcing the sending period for incoming parts. In other words, the next part is provided to subsystem X whenever possible. After an initial transient period during startup, subsystem X enters a steady state. The lengthy delay times, however, result in a longer cycle time (i.e., the full time necessary for subsystem X to process a part) than that achieved according to the part-flow timing diagram of FIG. 4.

(b) Variable Cycle Time of Subsystem Y

If the cycle time $CT_Y$ of subsystem Y varies between 75 seconds and 85 seconds due to non-deterministic processes, subsystem Y can only take a part from subsystem X once every 85 seconds to 95 seconds. Thus, the delay times used for steady state operation are not valid and the schedule for robot motion must be recomputed each time subsystem Y picks up a semi-finished part from subsystem X. In this illustrative example, there are two constraints on subsystem X. First, the part just processed at machine $M_c$ must be immediately picked up for transport. Second, a part must be available for subsystem Y when it is ready to take one.

In this case, the pattern for the part-flow timing diagram is not the same for each period and, depending on the temporal distribution of variation in the cycle time $CT_Y$ and the inherent conflict pattern, the task of scheduling can be significantly complex. In particular, the difficulty in scheduling results from the randomness in the transport conflict pattern. As previously described, when a time-dependent combinatorial complexity problem is converted into a periodic complexity problem, the design of the operations schedule is simplified. The conversion requires that a period FP be imposed on the system 10. In such a period FP, the same set of tasks is performed cyclically in a pre-determined way and, therefore, a limited number of scheduling possibilities exists. The period is initiated by an internal or external key event.

A basic constraint on the system 10 is that delivery of a part to subsystem Y must be completed as soon as possible. In this example, a part request from subsystem Y is chosen to be the key event for starting a new fundamental period FP for multiple reasons. First, subsystem Y limits the pace of the total system 10. Also, the pace of the system 10 has to be adjusted to accommodate the variations in the cycle time $CT_Y$ of subsystem Y. Because a part request issued by subsystem Y is treated as the key event, the length of each period FP depends on $CT_Y$. Even though the length of each period FP is generally different, the same set of functions is performed by the subsystem X and the robot completes all required transport tasks so that steady-state operation is maintained.

In order to manage the present case in accordance with the principles of the invention, the functional requirements of the system 10 are determined and mapped into a physical domain so that design parameters can be determined. This process proceeds from a determination of high-level functional requirements down to a more detailed level required for implementation. High-level functional requirements include the need to re-initialize subsystem X when subsystem Y requests a new part for processing; transporting parts whenever transport is requested and possible; and setting the various process times. Constraints on the system 10 include the need to transport a part from machine $M_c$ immediately once process c is completed and to provide a part from subsystem X to subsystem Y whenever subsystem Y requests a part.

As described earlier, the current state of subsystem X (i.e., which machines are available and the process times of occupied machines) is determined at the time of re-initialization. Appropriate delay times are then calculated for each of the occupied machines. First, to ensure that the robot is always available during the timeslot of the next renewal event, a no-transport-time is determined as $$\text{No\_transport\_time}=\{t|t \in [(MvPk_{Y-1}+MvPl_Y)+\min(CT_Y),(MvPk_{Y-1}+MvPl_Y)\cdot 2+\max(CT_Y)]\} \quad (9)$$

where t=0 at the moment of the current key event. Second, assign all transport tasks which are determined at the instant of re-initialization (i.e., prefixed transport tasks). Prefixed tasks include transport (1,2) by the definition of the key event, and possibly transport (3,4) due to the need to move a part quickly from machine Mc. Remaining transport tasks are then allocated.

Figure 6:
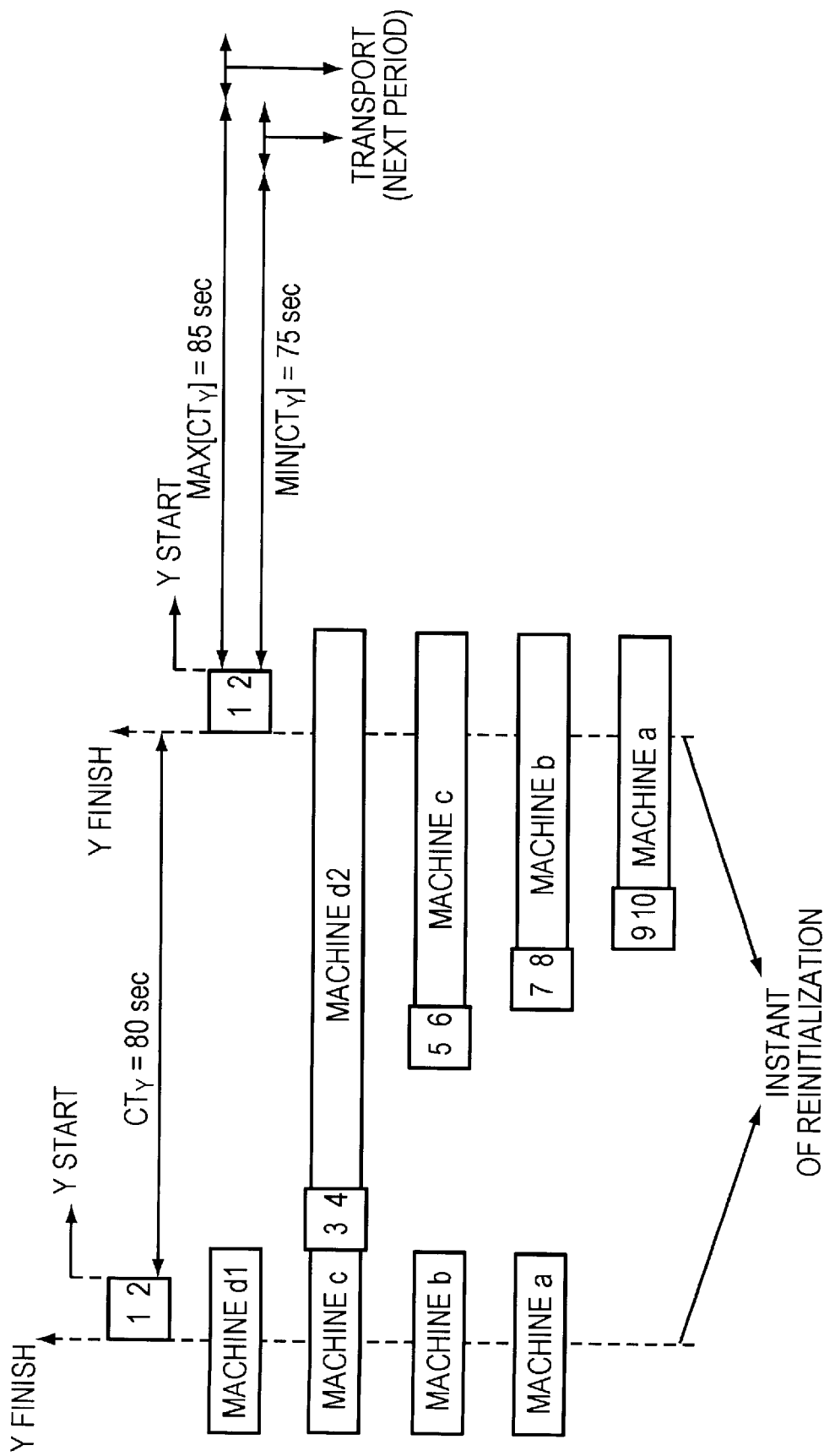

FIG. 6 depicts a part-flow timing diagram for the steady state operation shown in FIG. 5 with a change in the cycle time $CT_Y$ for subsystem Y. The vertical lines indicate the time when subsystem Y 30 requests a part from subsystem X and therefore represent the moments of re-initialization. As shown in the second full period, due to the variation in cycle time $CT_Y$, subsystem Y requests a finished part from subsystem X at some time at least 85 seconds but no more than 95 seconds after the re-initialization (10 second transport time plus ~75–85 second cycle time $CT_Y$). Therefore, the transport task is scheduled so that the robot is available for the period from 85 seconds to 105 seconds after the re-initialization.

After a part request is issued by subsystem Y (vertical line), a renewal signal is generated to re-initialize the database of processes. First, the state of each machine M is identified as busy or idle, and empty or occupied. At the onset of the second re-initialization (second vertical line), it is determined that machines $M_a$, $M_b$, $M_c$, and $M_{d2}$ are busy (and therefore occupied) and that machine $M_{d1}$ is occupied and idle. FIG. 7 depicts the remaining process times for the busy machines. Based on this information, the transport schedule is constructed. In this example, transport tasks (1,2) and (3,4) are prefixed tasks. Transport task (1,2) occurs 0 to 10 seconds after the moment of the re-initialization. Another task, (3,4), must occur from 15 to 25 seconds after re-initialization because the part in machine Mc must be removed as soon as process c is complete. The allowable transport timeslots are computed and the remaining transport tasks are assigned in the timeslots. One possible schedule is shown in FIG. 8 in which the x's signify the no-transport-time period. Transport task (5,6) is delayed for 20 seconds due to the no-transport-time condition. Transport tasks (7,8) and (9,10) simply follow task (5,6) at the earliest possible time according to fundamental conditions for part transport (i.e., the current machine is finished, the next machine is empty, and the robot is available).

Figure 9:
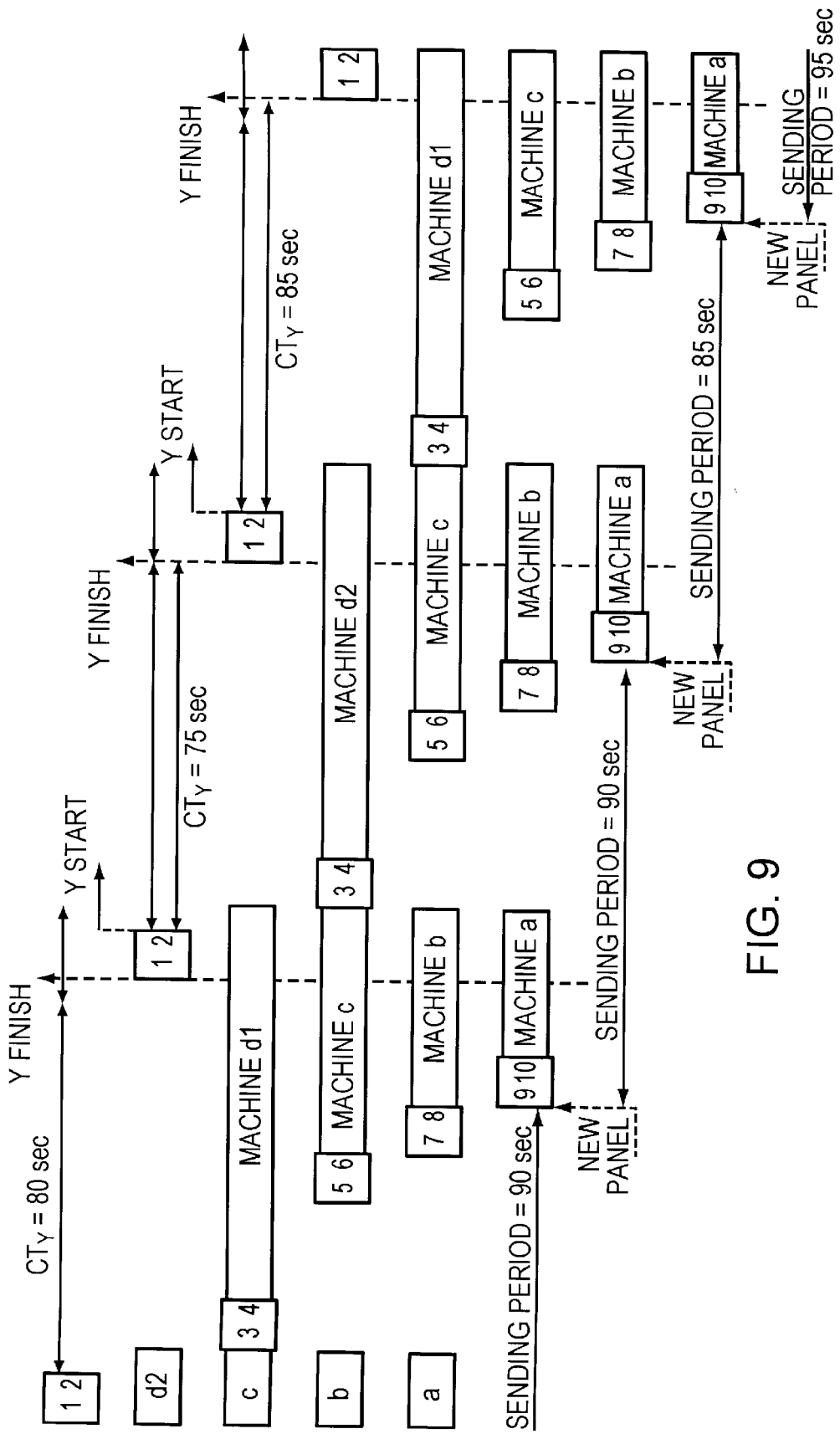

The next period (not shown) can be determined regardless of when subsystem Y picks up the part exiting subsystem X. FIG. 9 depicts multiple intervals with different cycle times $CT_Y$ for subsystem Y. Each interval is independent from the previous intervals except for the immediately preceding interval. In other words, the effect from the variation of the cycle $CT_Y$ for subsystem Y does not propagate to a later time.

Case 2: The throughput Rate of Subsystem X is Less Than That of Subsystem Y: $FP_X > FP_Y$ Case 2 is directed to a system 10 in which the fundamental period $FP_X$ of subsystem X exceeds the fundamental period $FP_Y$ of subsystem Y. Consequently, subsystem Y has to wait until a next part finishes its processes in subsystem X. In other words, subsystem Y is operated in a starved mode. Thus, it does not matter when subsystem Y finishes its processing and requests a new part as long as this relationship between the fundamental periods $FP_X, FP_Y$ exists. In other words, the variation of $CT_Y$ does not affect the operation of subsystem X.

In this example subsystem X has only one machine $M_c$ for process c. The process times for processes a, b, c, d, the cycle time $CT_Y$ for subsystem Y, the number of machines for each process, and the associated transport times are shown in Table 2. From equations (6) and (7), the fundamental period $FP_X$ for subsystem X is 80 seconds and the fundamental period $FP_Y$ for subsystem Y is 70 seconds. Consequently, the fundamental period FP of the total system 10 is 80 seconds. As in case 1, the actual cycle time $CT_Y$ of subsystem Y is assumed to vary within ±5 seconds.

Figure 10:
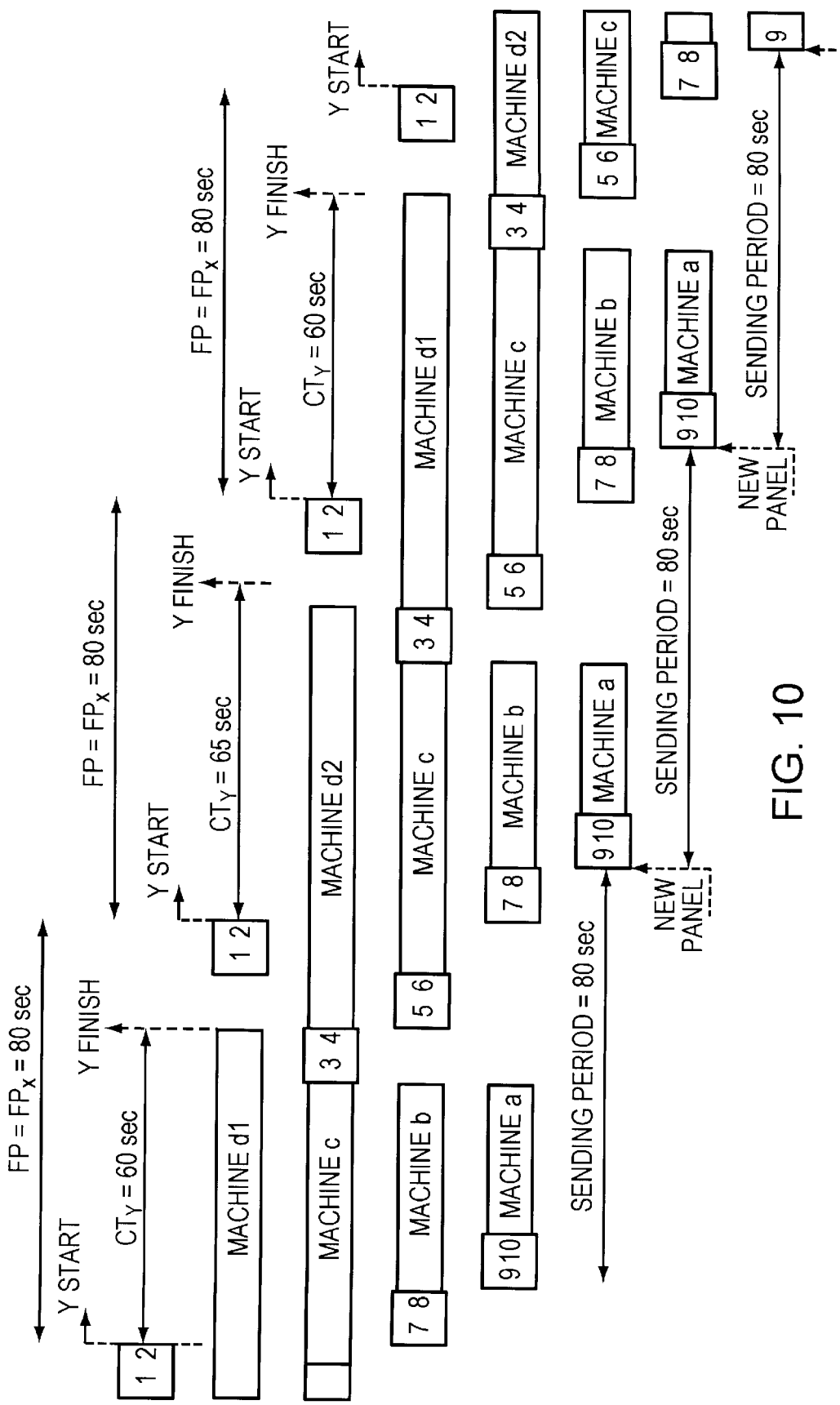

Under these conditions, any one of the three basic approaches (i.e., expert system, synchronous approach, and re-initialization) achieves similar results because the system 10 can be treated as having no cycle-time variation. In other words, even if subsystem Y requests a part when it is ready to process the next part, no part is available from subsystem X. As a result, subsystem Y must wait until a part is available and the variation in its cycle time need not be considered in the transport scheduling for subsystem X. FIG. 10 is a part-flow timing diagram for one possible solution based on the constant 80 seconds for the fundamental period FP.

TABLE 2

| Station | $PT_i$ or $CT_Y$ (sec) | Number of machines | $MvPk_i$ (sec) | $MvPl_i$ (sec) |
|---|---|---|---|---|
| IN | — | 1 | 5 | — |
| X | | | | |
| a | 30 | 1 | 5 | 5 |
| b | 40 | 1 | 5 | 5 |
| c | 60 | 1 | 5 | 5 |
| d | 80 | 2 | 5 | 5 |
| Y | 60 | 1 | — | 5 |

Alternatively, a re-initialization can be implemented based on the event "machine $M_d$ is ready to send a part and the robot is available." FIG. 11 shows information on the remaining process times and state of each machine at the time of re-initialization. This information is used to compute delay times and accordingly a robot schedule as shown in FIG. 12.

Case 3: Both Systems are About the Same, with $CT_Y$ fluctuating about its mean: $\min\{FP_Y\} < FP_X < \max\{FP_Y\}$ Case 3 is a hybrid version of case 1 and case 2 because the cycle time $CT_Y$ of subsystem Y is sometimes less than the cycle time $CT_X$ of subsystem X and at other times is greater than that the cycle time $CT_X$ of subsystem X. Unfortunately, the faster cycle times $CT_Y$ cannot be used to directly offset the slower cycle times $CT_Y$ for subsystem Y because the duration of the next cycle time $CT_Y$ of subsystem Y is not known a priori. In other words, since it is not known when subsystem Y will request its next part, subsystem X has to be ready to deliver a part at the earliest possible request time by subsystem Y if it is to keep pace.

The process times, number of machines and associated transport times are shown in Table 3. According to equation (6), the fundamental period $FP_X$ of subsystem X is 70 seconds. Based on a variability of 5 seconds in the cycle time $CT_Y$ of subsystem Y, its fundamental period $FP_Y$ is 65 to 75 seconds.

TABLE 3

| Station | $PT_i$ or $CT_Y$ (sec) | Number of machines | $MvPk_i$ (sec) | $MvPl_i$ (sec) |
|---|---|---|---|---|
| IN | — | 1 | 5 | — |
| X | | | | |
| a | 30 | 1 | 5 | 5 |
| b | 40 | 1 | 5 | 5 |
| c | 50 | 1 | 5 | 5 |
| d | 80 | 2 | 5 | 5 |
| Y | 60 | 1 | — | 5 |

Figure 13:
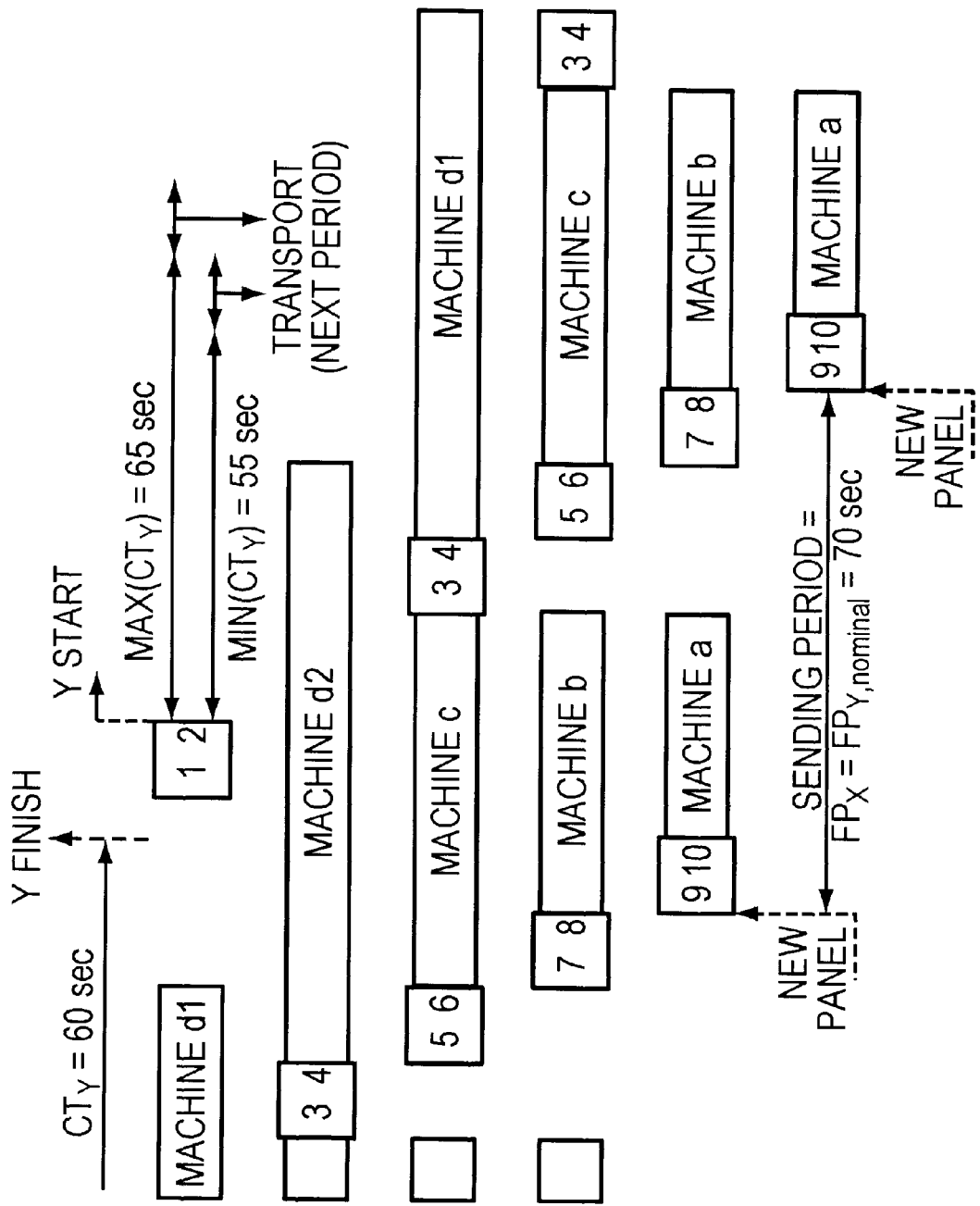

FIG. 13 depicts one mode of steady state operation of subsystem X with a fundamental period FP of 70 seconds. Limited to the illustrated instance, subsystem X appears capable of providing a part to subsystem Y even if subsystem Y has a cycle time $CT_Y$ of 55 seconds. In particular, the fundamental conditions for part transport are satisfied because a part is ready at machine $M_{d2}$, the robot is available, and subsystem Y is ready to accept a part. Referring to FIG. 14, however, it can be shown that subsystem X cannot sustain a high system throughput over many intervals.

FIG. 14 includes a series of part-flow timing diagrams arranged in chronological order. FIG. 14b immediately follows FIG. 14a in time, FIG. 14c immediately follows FIG. 14b in time, and so on. Each row in the figures is numbered according to a specific part number and the horizontal axis represents increasing time. An interval is defined as the period of time between a "Y finish" and the immediately following "Y finish".

Figure 14A:
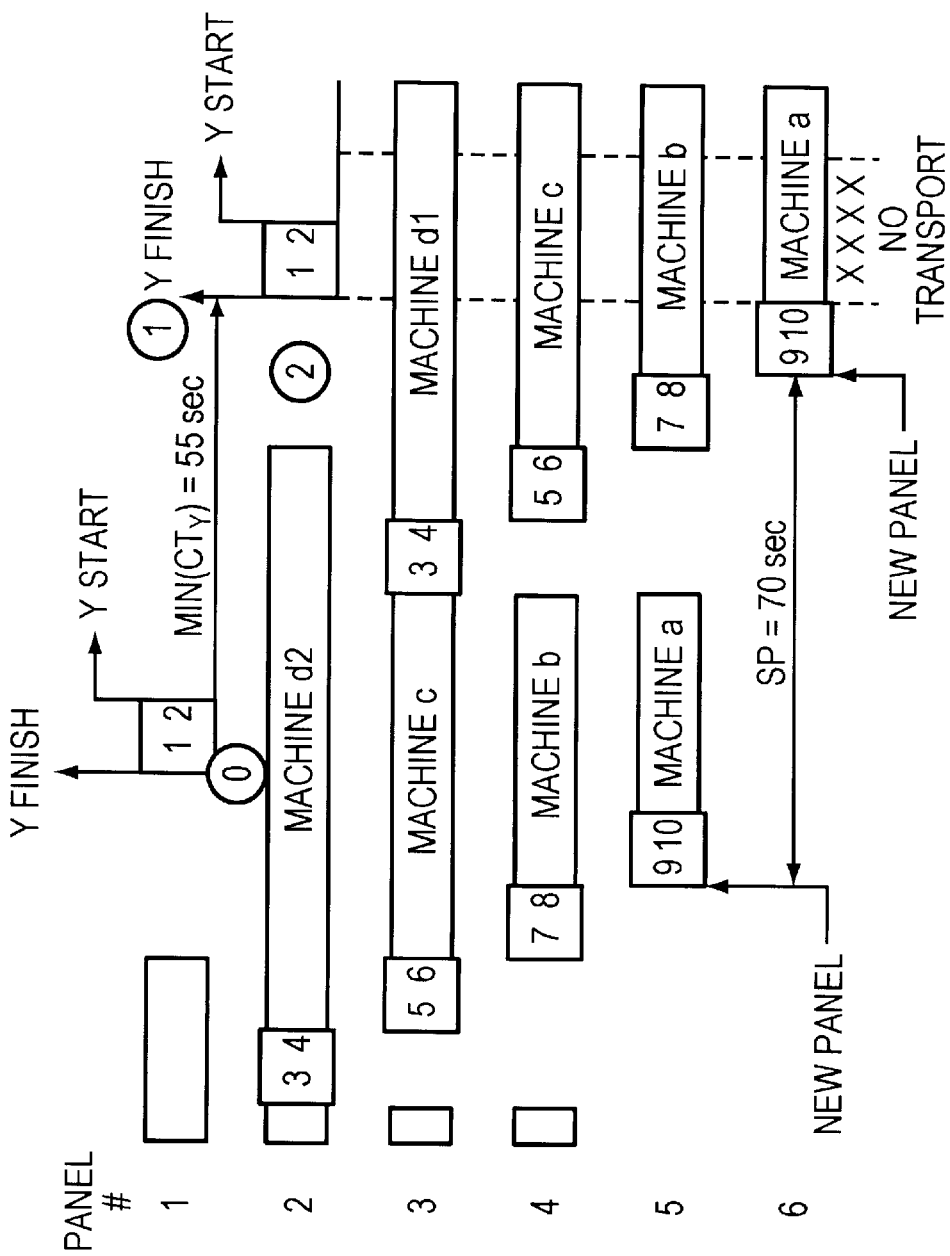
Figure 14B:
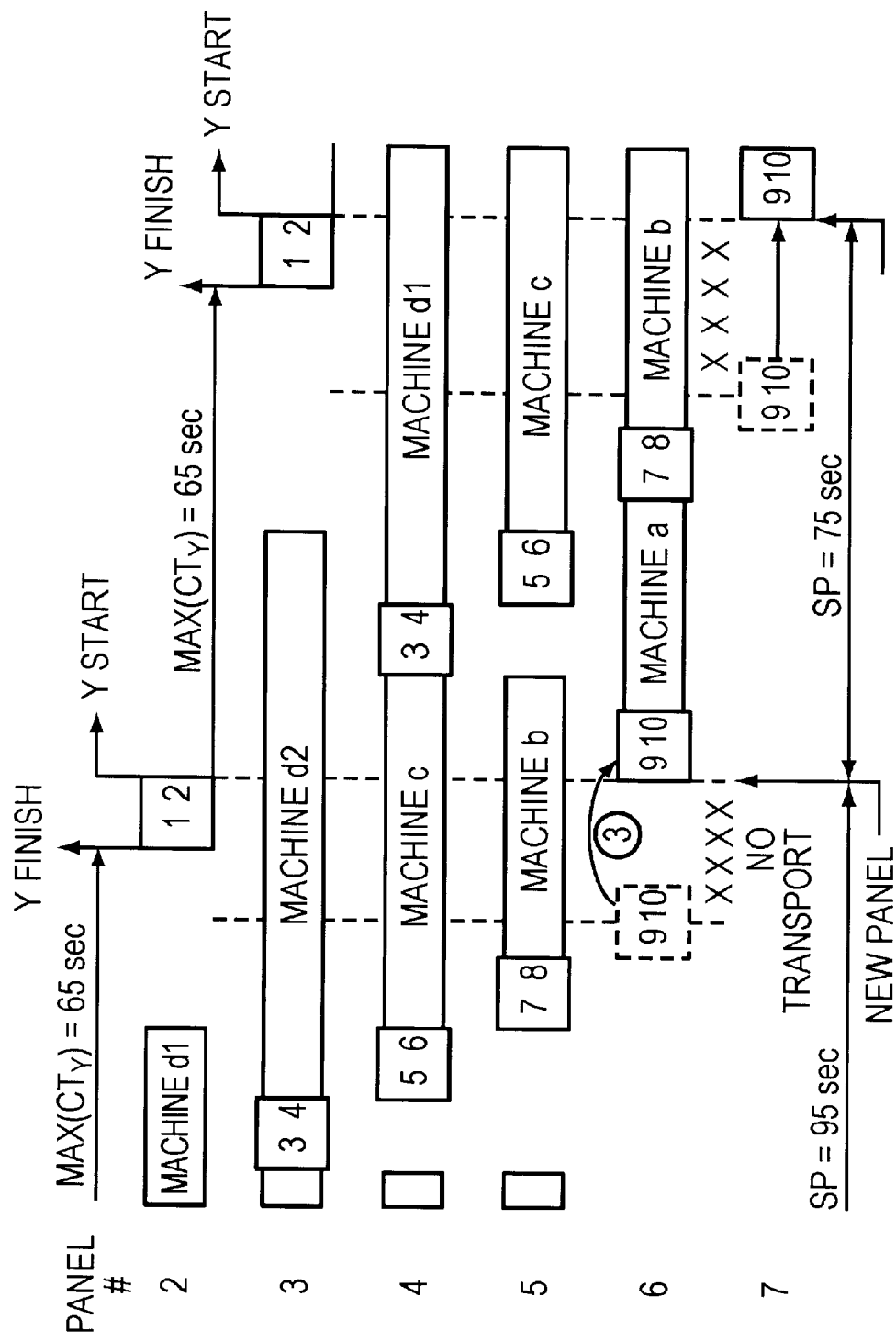
Figure 14C:
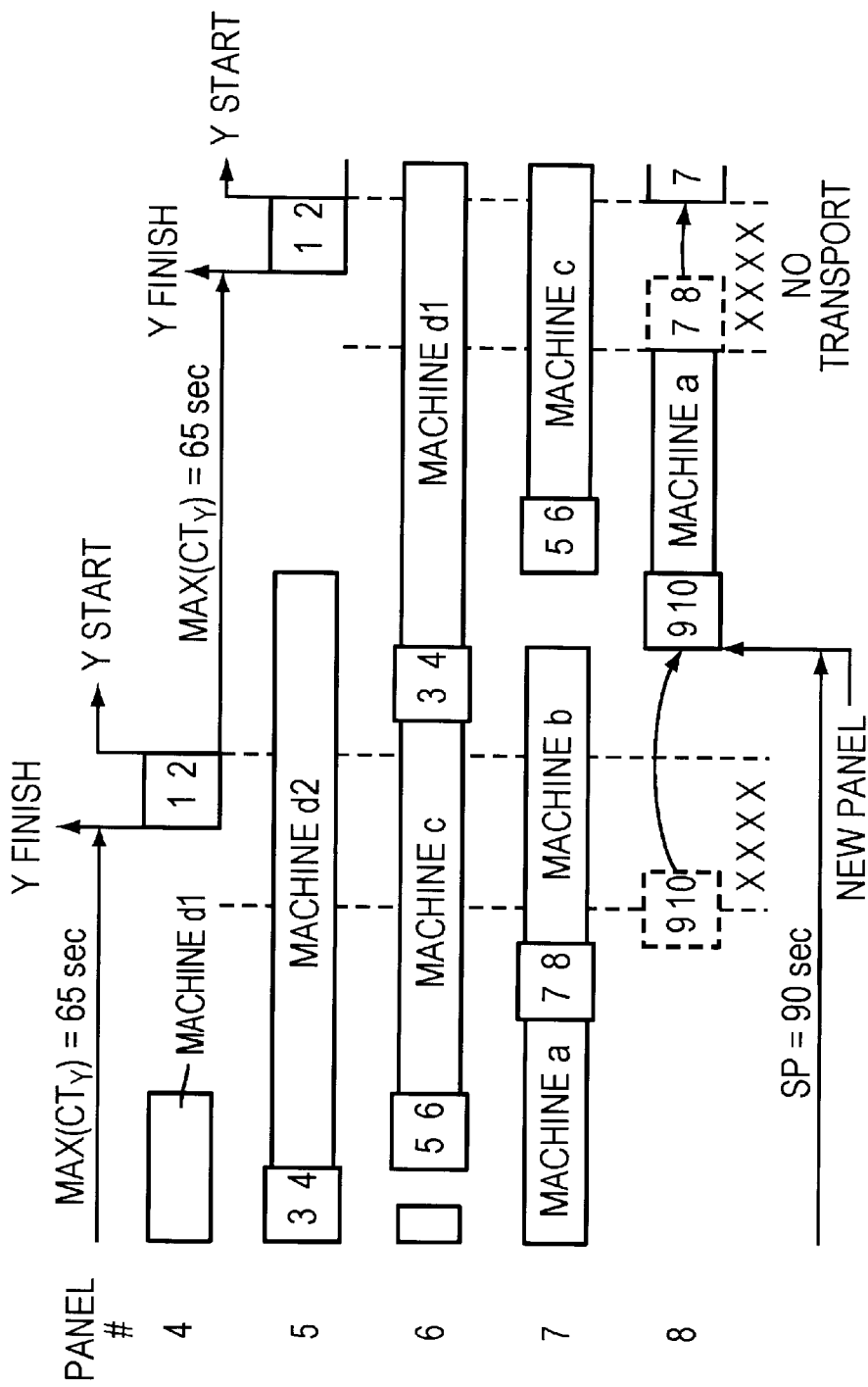
Figure 14D:
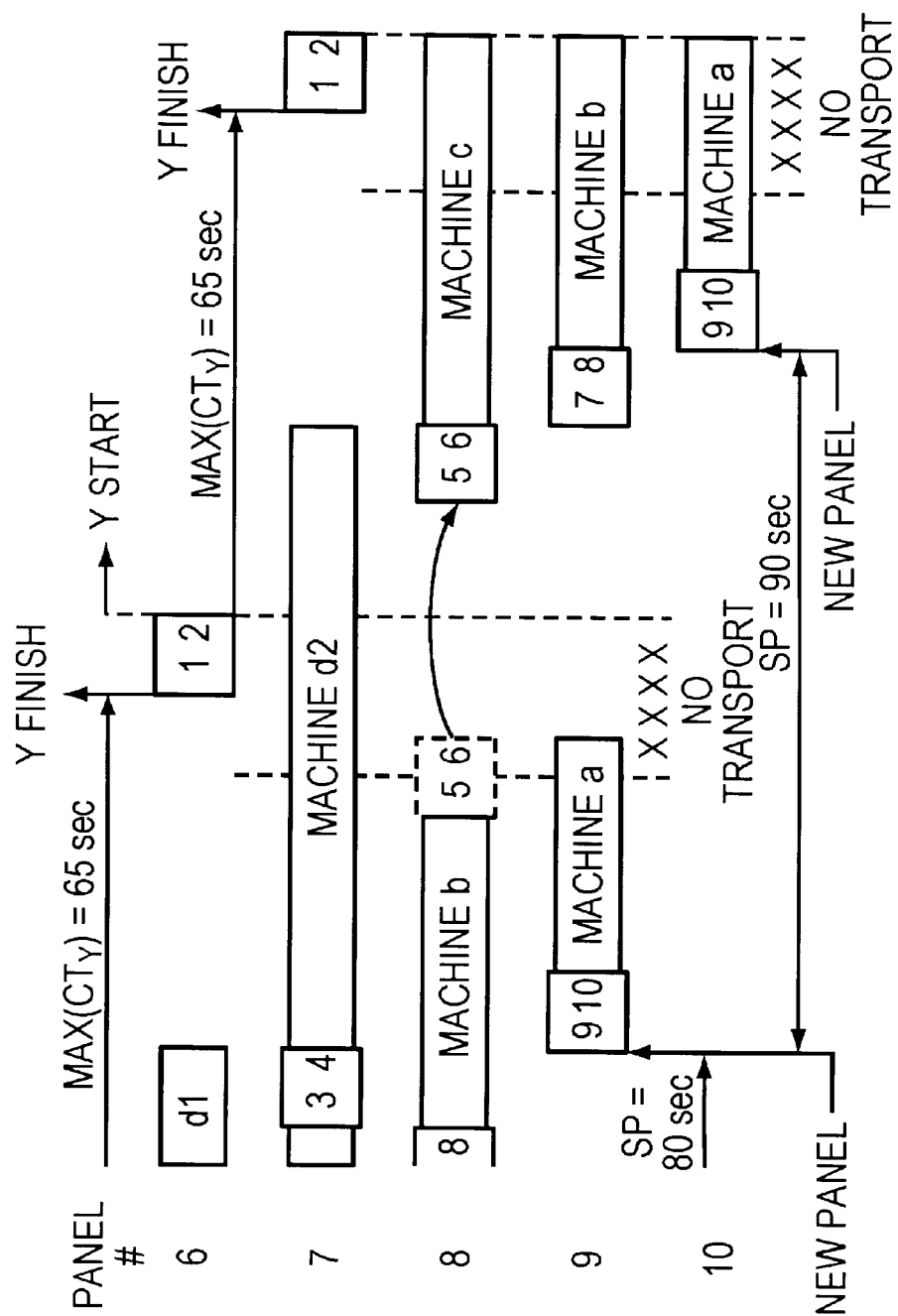

In FIG. 14a, subsystem Y requests a part after a cycle time $CT_Y$ of 55 seconds (see (①)). Subsystem X is able to deliver a part for this early request because machine $M_{d2}$ has completed its process and waits for part number 2 to be picked up (see (②)). Thus, when subsystem Y completes its cycle $CT_Y$, part number 2 is immediately provided. As a result, the throughput time (from "Y finish" to the next "Y finish") is 65 seconds. In FIG. 14b, $CT_Y$ is shown as 65 seconds. There are only four transport tasks, i.e. (1,2), (3,4), (5,6), and (7,8) in the first interval. It is required that a no-transport-time duration of 20 seconds (indicated by two vertical lines and the x's) be available to handle variations in the cycle time $CT_Y$ of subsystem Y. Consequently, transport task (9,10) cannot be performed during the first interval of FIG. 14b and is instead delayed to the next interval (see (③)).

Figure 14E:
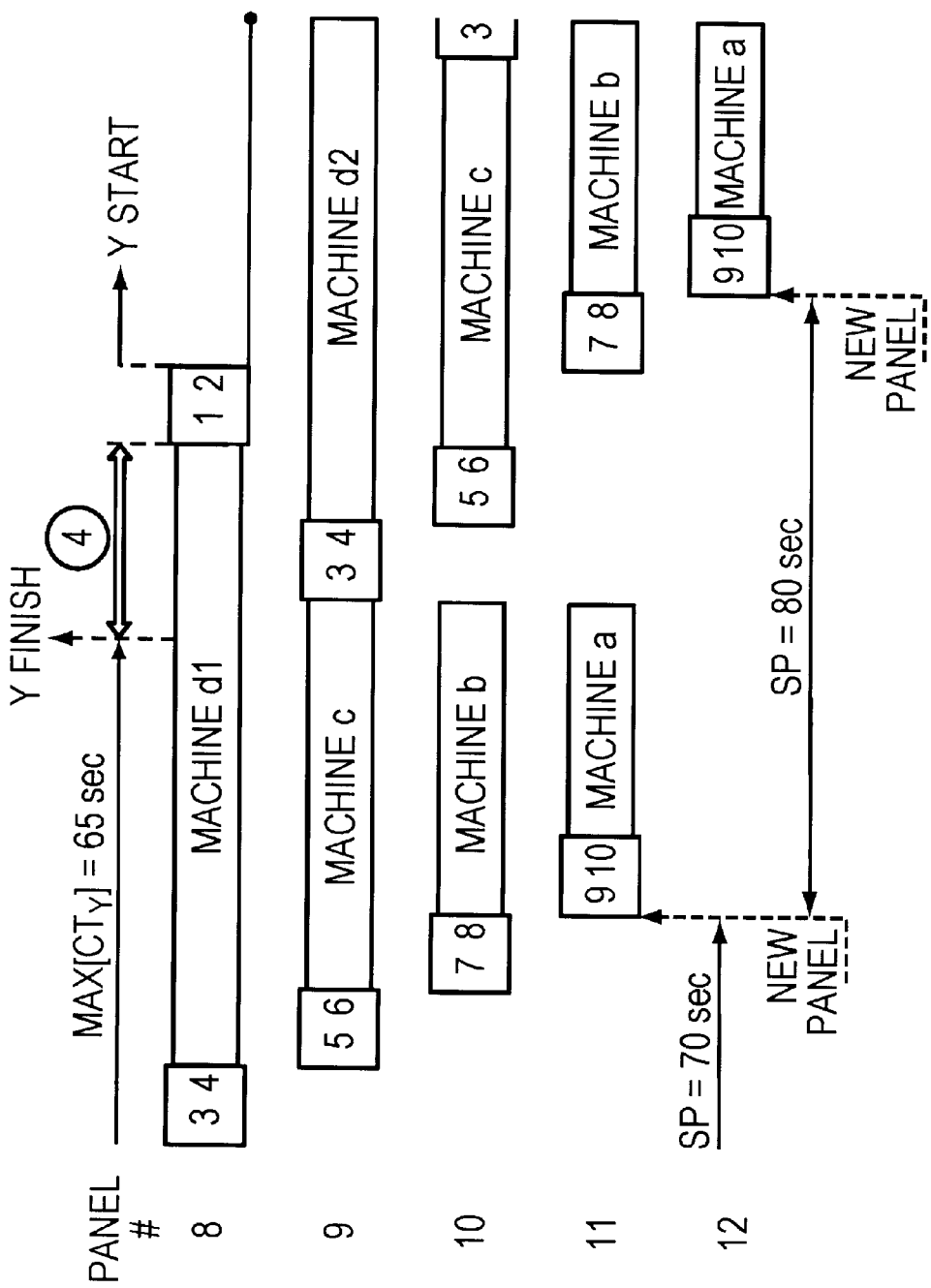
Figure 14F:
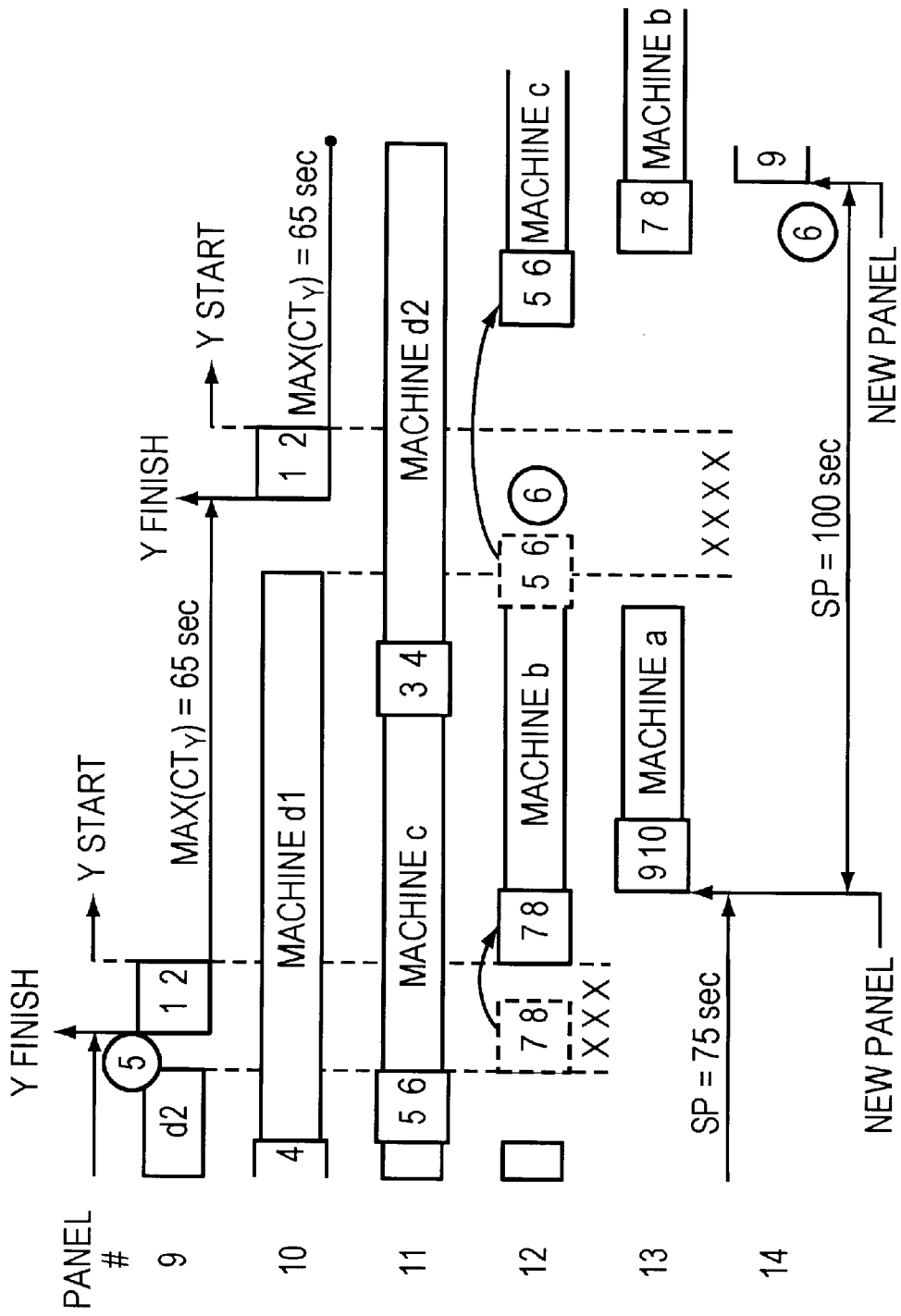
Figure 14G:
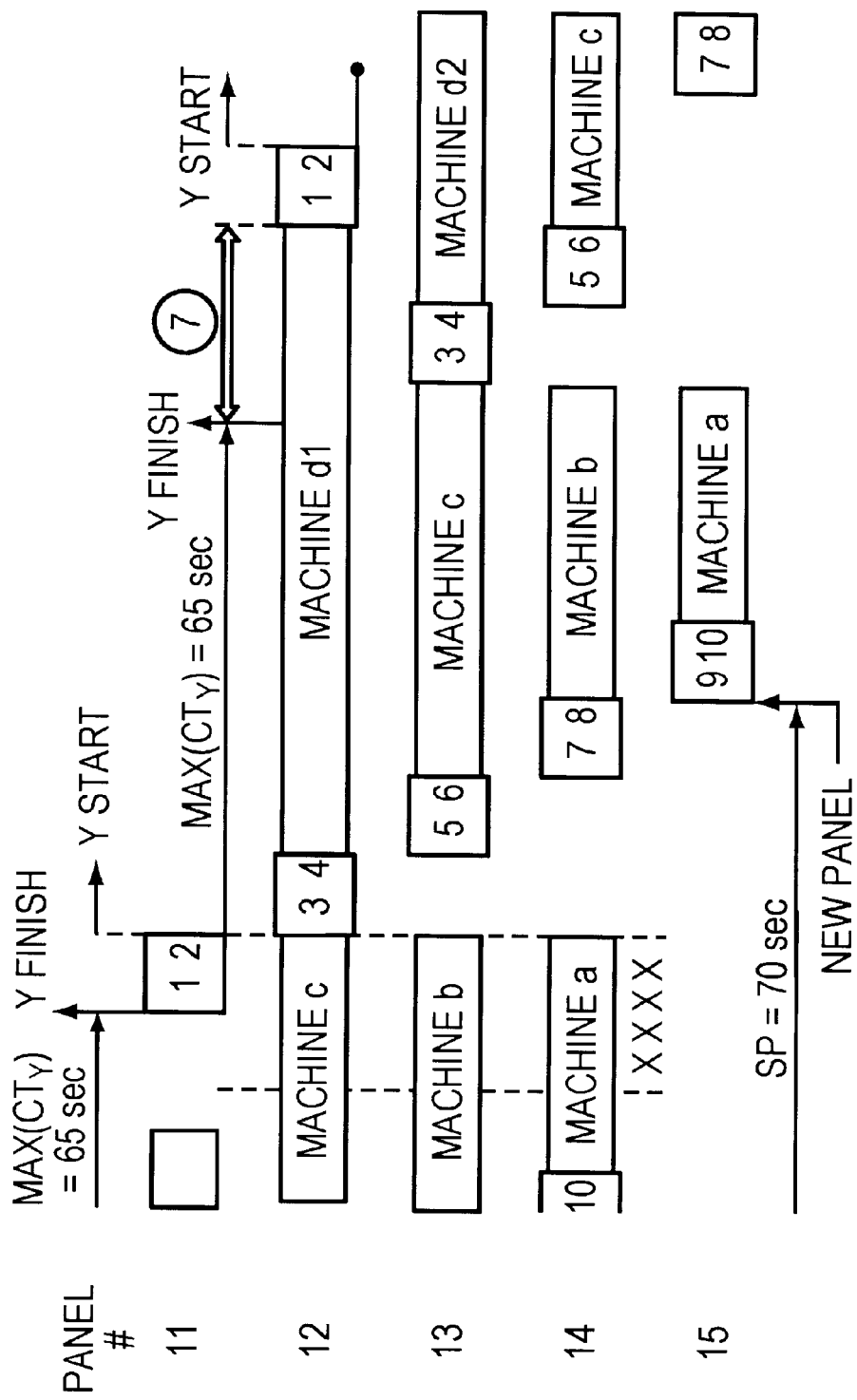

The effect of the incomplete interval is first manifested in the elongation of subsequent sending periods as well as immediate increase shown in FIG. 14b. Some of the subsequent sending periods are longer than the 75 second fundamental period FP based on the 65 second cycle time $CT_Y$ of subsystem Y. Unless there is a sufficient number of short sending periods to compensate for the effect of the long sending periods, the system 10 will not be able to produce parts per its nominal FP of 75 seconds due to the shortage of parts introduced into the system 10. For the intervals up to and including FIG. 14d, subsystem X manages to follows the rate of requests from subsystem Y. In FIG. 14e, however, there is no part in subsystem X ready to satisfy a parts request from subsystem X (see (④)). As a result, subsystem Y must wait for its next part. In the first interval shown in FIG. 14f, subsystem X regains its ability to immediately satisfy a parts request from subsystem Y (see (⑤)). However, the no-transport-time condition in the next interval produces a long sending period of 100 seconds (see (⑥)), which returns the system 10 back to the shortage state. FIG. 14g illustrates another instance of delay in part delivery from subsystem X to subsystem Y (see (⑦)). FIG. 14g is the same as FIG. 14e, thus it is apparent that the system 10 achieves a steady state and that an extension of the part-flow timing diagrams of FIG. 14 is simply a repetition of FIGS. 14f and 14g.

Figure 15:
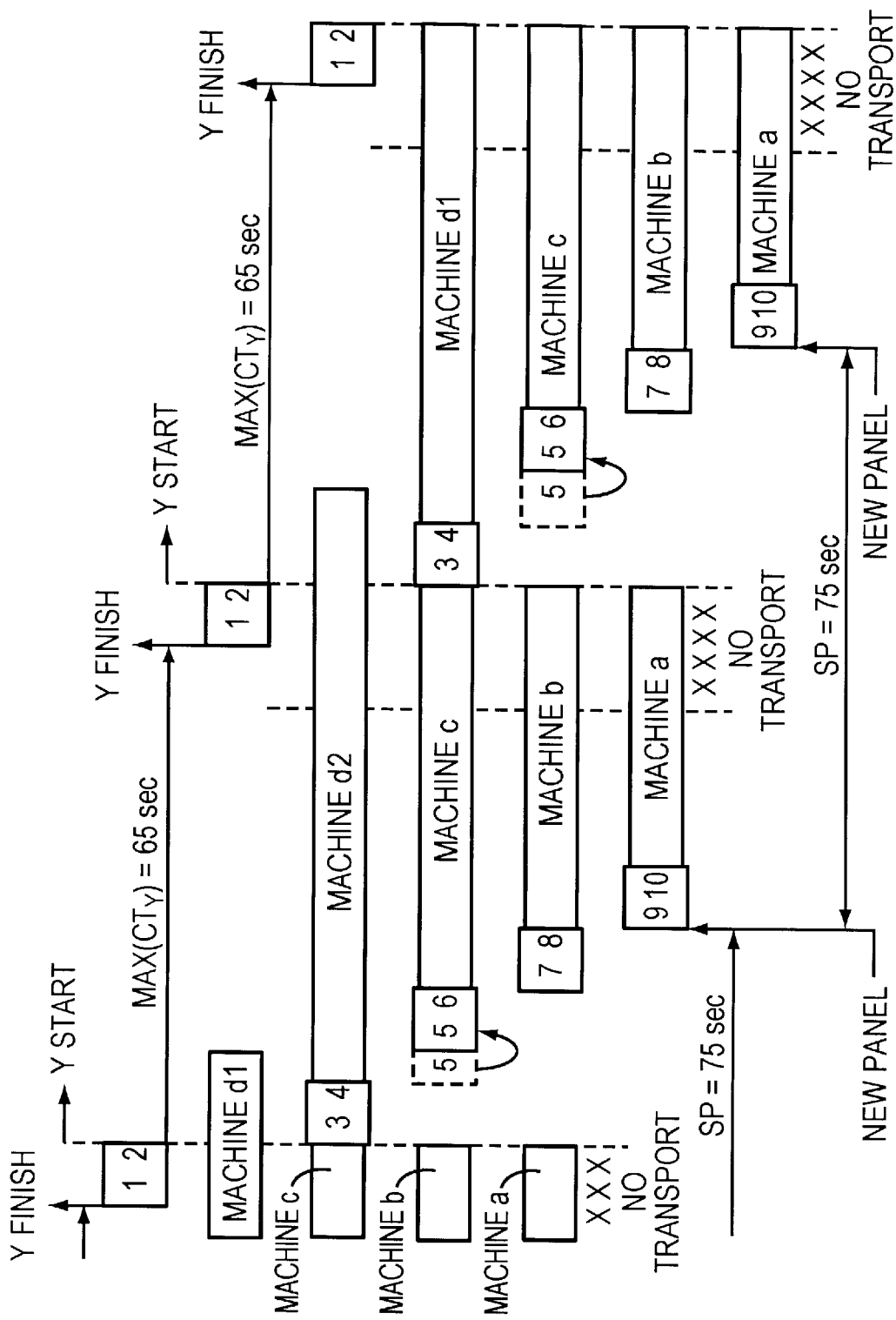

Subsystem X is faster than subsystem Y when the cycle time $CT_Y$ of subsystem Y is 65 seconds ($FP_Y$=75 seconds). Thus it might be expected that subsystem X 20 would evolve to a steady state operation such that the fundamental period FP of the system 10 is 75 seconds. This is the case if the cycle time $CT_Y$ is 65 seconds without exception. FIG. 15 shows the steady state operation under such a condition. Location of the no-transport time is fixed relative to the other robot moves, thus the same part-flow pattern is established in steady state. FIG. 14 demonstrates, however, that a single occurrence of a 55 second cycle time $CT_Y$ combined with an attempt to run subsystem X above its maximum speed results in a degradation of system performance. As a result, the system 10 cannot even maintain a fundamental period FP of 75 seconds at which it otherwise can operate. Every fourth interval, subsystem Y must wait for an additional 25 seconds. Thus its average throughput time in steady state is 81.25 seconds (i.e., (75+75+75+100)/4 seconds). Since the system is in steady state, the average sending period is the same as the average throughput time.

In the immediately preceding example, the longer interval of subsystem Y does not compensate for the shorter interval of subsystem Y. Even in the longer period, in order to cover the full range of variation in cycle time $CT_Y$, subsystem X should complete its cycle (process and transport) within the minimum cycle time $CT_Y$ of subsystem Y, leaving enough time to accommodate the no-transport time. If subsystem X cannot complete a cycle $CT_X$ within one interval of $CT_Y$, the scheduling problem becomes a time-dependent combinatorial complexity problem lacking periodicity. As a result, opportunities for non-optimal scheduling decisions increase and the overall system performance can degrade.

To establish time-dependent periodic complexity in the case of the present example, subsystem X is initialized upon a request by subsystem Y if the request occurs at or after the expiration of the fundamental period $FP_X$ of subsystem X. If the request occurs prior to the completion of the fundamental period $FP_X$, subsystem X is initialized at the expiration of the fundamental period $FP_X$. In other words, if subsystem Y requests a part at a pace faster than pace of subsystem X, initialization must wait until the fundamental period $FP_X$ has ended. Under this limitation, the scheduling procedures used in cases 1 and 2 can be applied to the present example.

FIG. 16 shows the remaining process times and state of each machine at the moment of initialization (see ⓪ (in FIG. 14a). The no-transport time is determined to be the duration between 70 seconds and 85 seconds after the moment of re-initialization. The time from 65 seconds to 70 seconds is excluded from the no-transport-time because, as previously described, the re-initialization cannot occur before the fundamental period $FP_X$ of 70 seconds has expired. Prefixed transport tasks (1,2) and (3,4) are allocated within the no-transport-time interval. The other transport tasks are assigned based on the fundamental conditions of part transport. If necessary in the later part of interval, a finished part in machine $M_{d2}$ does not leave until another part request is issued by subsystem Y. One possible schedule is shown in FIG. 17.

The invention may be embodied in other specific forms without departing from the spirit or essential characteristics thereof. The foregoing embodiments are therefore to be considered in all respects illustrative rather than limiting on the invention described herein. The scope of the invention is thus indicated by the appended claims rather than by the foregoing description, and all changes which come within the meaning and range of equivalency of the claims are therefore intended to be embraced therein.

What is claimed is:

1. A method of managing a processing system having a plurality of functional requirements, wherein i) the processing system includes a plurality of processes operating on items, ii) at least one process cannot begin until another process has been completed, and iii) upon completion of a process, a processed item is subject to a subsequent process, the method comprising the steps of:

determining a current remaining process time until completion for each of the plurality of processes;

determining a current wait time comprising a buffer time between the completion of a process and a subjection of a processed item to a subsequent process, for each of the plurality of processes;

determining a system period in response to the plurality of remaining process times until completion and the plurality of wait times; and initializing the plurality of functional requirements based on the system period.

2. The method of claim 1 wherein the step of initializing the plurality of functional requirements is performed at the expiration of the system period.

3. The method of claim 1 wherein the step of initializing the plurality of functional requirements is performed at the occurrence of a key functional requirement.

4. The method of claim 1 wherein the plurality of processes comprises semiconductor wafer fabrication processes.

5. The method of claim 1 wherein the step of determining a current wait time for each of the processes is responsive to a respective one of a plurality of transport availabilities.

6. The method of claim 1 wherein the step of determining a current wait time for each of the processes is responsive to a respective one of a plurality of subsequent process availabilities.

7. The method of claim 1 further comprising the step of calculating a function state vector in response to the steps of determining a current remaining process time until completion and determining a wait time.

8. A system for processing items according to a plurality of processing tasks, the processing tasks being associated with processing stations, wherein at least one processing task cannot begin until another processing task has been completed, and upon completion of a processing task, a processed item is subject to a subsequent processing task, the system comprising:

a monitor module in communication with the processing stations, the monitor module determining a current remaining process time until completion for each of the plurality of processing tasks; and a processor in communication with the monitor module, the processor determining a plurality of wait times for each of the plurality of processing tasks in response to the completion times, the plurality of wait times comprising buffer times between completion of a processing task and subjection of a processed item to a subsequent process, the processor determining a system period in response to the plurality of wait times and the plurality of current remaining process times until completion, the wait times governing subjection of items to the processing tasks.

9. The system of claim 8 further comprising a transport module in communication with the processor, the transport module moving at least one of the items from one of the processing stations to another of the processing stations based on the wait times.

10. The system of claim 8 wherein the processor generates a re-initialization signal at the expiration of the termination period.

11. A data structure stored in a memory, the data structure comprising a plurality of data elements, each of the data elements indicating the state of a functional requirement of a periodic multiple processing task system.

\* \* \* \* \*